C. B. SIMMONS.
WORK HOLDER.
APPLICATION FILED JUNE 17, 1915.

1,235,941.

Patented Aug. 7, 1917.

INVENTOR:
CHARLES B. SIMMONS,
BY
Gales G. Moore
his ATTORNEY.

UNITED STATES PATENT OFFICE.

CHARLES B. SIMMONS, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

WORK-HOLDER.

1,235,941.

Specification of Letters Patent.

Patented Aug. 7, 1917.

Application filed June 17, 1915. Serial No. 34,706.

*To all whom it may concern:*

Be it known that I, CHARLES B. SIMMONS, a citizen of the United States, residing at Bristol, county of Hartford, State of Connecticut, have invented a certain new and useful Work-Holder, of which the following is a full, clear, and exact description, such as will enable others skilled in the art to which it appertains to make and use the same, reference being had to the accompanying drawings, forming part of this specification.

My invention relates to external work holders and more particularly to external chucks.

In external chucks as heretofore constructed and designed for holding work, as an annular race-ring of a ball bearing which has had its exterior periphery ground to a true circle, in position in the grinding machine to have its interior periphery ground concentric with the outer periphery a difficulty has been that such chucks, due to various causes, were not sufficiently accurate to hold the work with that accuracy necessary to insure the required practically absolute concentricity of the two peripheries. I have devised an external chuck having an accuracy sufficiently great to adapt it for satisfactorily holding such race-rings during grinding.

One object of my invention is to provide an external chuck of great accuracy.

Another object is to provide an external chuck having balls for contact elements.

Another object is to provide an external chuck having a large number of contact elements.

Another object is to provide an external chuck having contact elements giving practically point-contact with the work.

Another object is to provide an external chuck of the character above indicated which is simple and comparatively inexpensive to manufacture.

To these ends and also to improve generally upon devices of the character indicated, my invention consists in the various matters hereinafter described and claimed.

Figure 1:
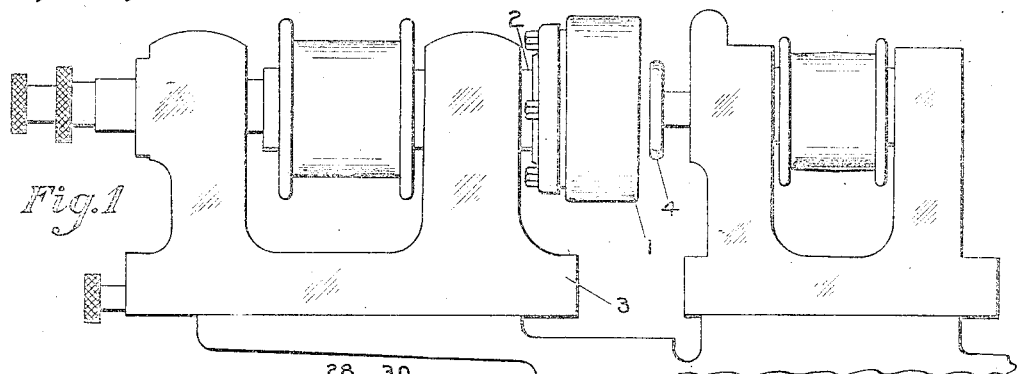
Figure 1 is a somewhat conventional side elevation of an oscillating-head grinding machine for internal grinding with an external chuck embodying my invention mounted thereon.

Although I have illustrated and more particularly described a chuck embodying my invention as more particularly adapted for holding race-rings it will be understood that my invention is not restricted to such application.

I illustrate a chuck embodying my invention, designated generally as 1, as mounted upon and concentric with the rotating spindle 2 of an internal grinding machine having the horizontally oscillating head 3 and the rotating grinding wheel 4 adapted to be advanced into the work 5 (Fig. 2) to grind the same upon its interior periphery.

Referring now more particularly to Figs 1 to 5, the chuck 1 comprises a body portion 6 provided with the female conical taper 7, such taper having its interior surface circular at all points of its length, *i. e.*, the inner periphery of each and every cross-section at right angles to the central longitudinal axis thereof is a circle, such circle being concentric with such axis. Each longitudinal element of the taper is a straight line. The taper is of course concentric with the central longitudinal axis and, when the chuck is mounted on the spindle of the machine with its axis coincident with that of the spindle, is concentric with the rotational axis.

Figure 2:
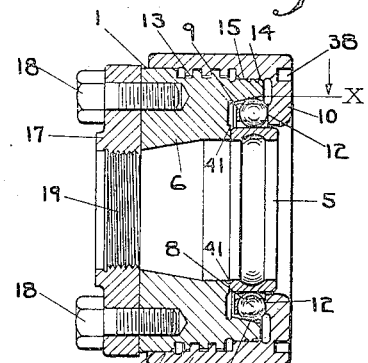
Fig. 2 is a view of a chuck embodying my invention in substantially diametrical cross-section.
Figure 3:
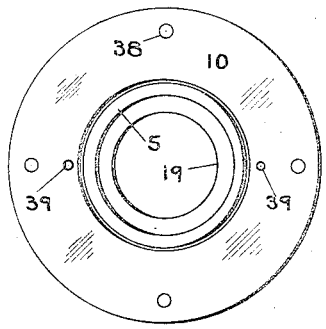
Fig. 3 is an end view of the device illustrated in Fig. 2.
Figure 5:
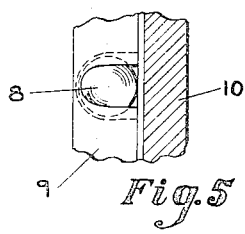
Fig. 5 is an enlarged fragmental view looking down on the top of the separator, as in the direction of the arrow Fig. 2, and showing a ball in place and a portion of the forcing flange, such flange being sectioned substantially on the line $x$ Fig. 2.
Figure 4:
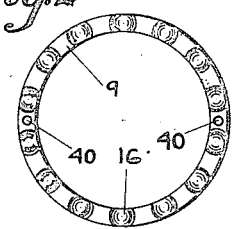
Fig. 4 is a face view of the separator.

In contact with the taper is an annular series, say fourteen, of like-size balls 8, preferably carried in a separator or retainer 9. Associated with the body portion 6 of the chuck is a flange 10 in contact with the balls, and such flange or abutment can be moved forward and backward along the axis of the taper. When the flange forces the balls to the left (as illustrated in Fig. 2) along the taper they are moved radially of the taper into contact with the circular already ground outer periphery of the race-ring 5 and grasp and center the ring. Since the taper is concentric with the rotational axis and the balls are of like diameter, and the periphery of the taper is a true circle in cross-section, it is clear that the work will be accurately centered and the inner periphery thereof will be ground absolutely concentric with the outer periphery which is the ultimate desired result.

I prefer balls such as are used for ball bearings for contact elements as they can be procured varying in diameter something less than .0001 inch each from the other so that the circle defined by their active contact areas, i. e., the areas in contact with the work, will be a true circle.

Moreover the balls give practically point-contact with the work and the taper so that even though they twist in the chuck the accuracy of the device will not be impaired. Again, contact elements with substantially point-contact permit the escape of the grinding dust from the surfaces of the work and the taper so that such dust is not ground into these surfaces to thereby injure them. Also of course balls present a large number of point-contact areas resulting in long wear.

I prefer to use a large number of contact elements as I thereby define the circle presented by the active contact areas much more accurately than would be possible with a small number of contact elements.

Thus a chuck embodying my invention preferably comprises a female conical taper concentric with the axis of rotation, a series of contact elements of like dimensions radially of the taper, as the balls 8 of like diameters, and means for forcing the contact elements along the female taper, as the flange 10, to thereby move such elements radially of the taper into contact with the work, such elements desirably having contact areas giving practically point-contact, and preferably being of comparatively large number.

In the illustrated device the flange 10 is carried by a sleeve 11, as by being made integral therewith, with its ball-contacting face 12 at right angles to the central longitudinal axis of the chuck and hence, when the chuck is mounted in the machine, at right angles to the rotational axis. With the face 12 located at right angles to the axis the balls resting against such face have their centers lying all in the same plane at right angles to the rotational axis and therefore the active contact areas of the balls, i. e., the points in contact with the work, all lie in the same plane at right angles to such axis. The result is that in centering the work 5 all possibility of its canting is eliminated and it will be centered with the utmost accuracy with the circle of its outer periphery absolutely concentric with the rotational axis and with its plane at right angles to such axis.

As illustrated the flange 10 is dished upon its left hand face sufficiently to insure that it will not contact the end of the taper in such left hand movement as is necessary to center and clamp rings of the sizes with which the device is intended to be used.

Preferably the sleeve 11 is threaded to the body portion 6, as at 13, with the result that by turning the sleeve the flange 10 may be moved toward the balls to force them along the taper or may be turned to move the flange away from the balls to release the work and the balls. Of course the threads serve as a means for holding the sleeve in its adjusted position upon the body portion. In order to insure that the sleeve 11 will not wabble upon the body portion, which action might result in throwing the flange 10 and its face 12 out of true, I prefer to provide plain cylindrical surfaces 14, 14 upon the interior of the sleeve 11 at each side of the threads 13 and closely mating with the cooperating similar surfaces 15, 15 of the body portion, and I also prefer to make the threads 13 square as illustrated. The closely mating cylindrical surfaces insure the non-wabble of the sleeve and the square threads additionally contribute to this result.

Preferably the separator or retainer 9 is rigidly connected with the sleeve 11 to be movable backward and forward therewith and to be held out of contact with the work and the taper and may conveniently be soldered to the flange 10 or pinned thereto by dowel pins 39 driven into the holes 40 and into the flange. Thus when the flange is moved to the right (Fig. 2) the balls will be carried with it out of contact with the taper and the work thereby to release the balls and the work.

Of course the pockets 16 of the separator, here shown as closed along the left hand wall and open at the right facing the flange 10, are enough larger than the balls and of such contour as to permit the balls to turn therein and to move radially inward and outward therein into and out of contact with the work and the taper in all the various positions longitudinally of the taper without hindrance from the separator.

The chuck 1 may be carried upon the spindle 2 of the machine in any suitable manner. As here illustrated the body portion 6 carries an annular face-plate 17 fast connected therewith by the screws 18, and such plate 17 is threaded at 19 concentrically with the taper so that it may be screwed upon the usual and common threads (not shown) of the spindle.

In operation the flange 10 is moved to the right, the work is inserted in the taper and the flange 10 is moved to the left sufficiently far to press against the balls with the force necessary to prevent the turning of the work with respect to the chuck under the action of the grinding wheel and to hold the work accurately centered during the grinding.

Desirably the body portion 6 may be provided with an abutment for steadying the work and in the illustrated embodiment which is more particularly designed for race-rings with their edges at right angles to the central axis of the rings I provide an annular face 41 with its plane at right angles to the central longitudinal axis and against which the work may abut as shown. With an abutment of this character, and when used with race-rings of the character noted, there is no tendency for the work to be canted by the abutment if, by any chance, it should be unduly forced against the abutment.

Of course the pockets 16 of the separator provide sufficient clearance at the rear of the balls and about the balls (see Fig. 5 in which the actual clearances which may be used are shown considerably exaggerated) to insure that the separator will not bind the balls thereby to interfere with the balls accurately assuming their position between the work and the taper. Of course, in devices such as that illustrated, and in which care is taken to mount the separator concentric with the axis of the taper and with the plane of the centers of the ball pockets at right angles to such axis, and which is designed for use in holding race-rings all of practically the same diameter, the clearances may be very small.

Figure 6:
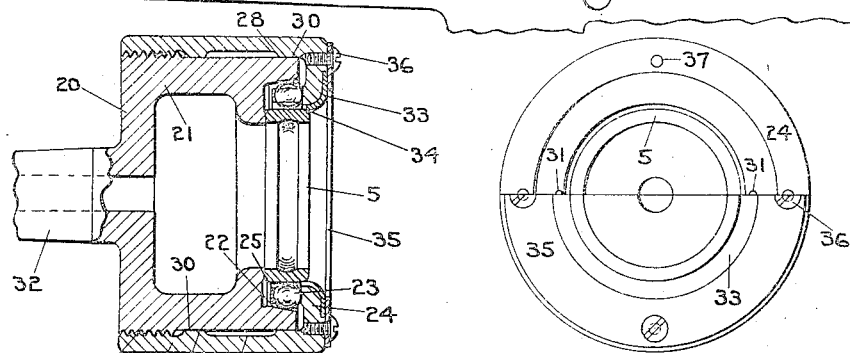
Fig. 6 is a view of a somewhat modified form of a chuck embodying my invention substantially in diametrical cross-section, parts of the shank being broken away to economize space.
Figure 7:
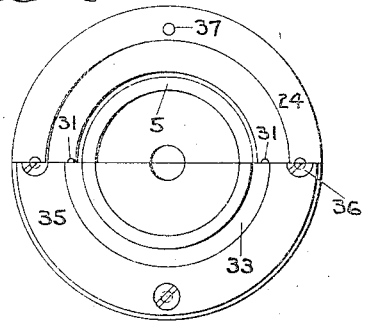
Fig. 7 is an end view of the device illustrated in Fig. 6 but with the upper semicircumference of the gasket and that of the clamping washer removed.

Referring now to the slightly modified chuck 20 illustrated in Figs. 6 and 7, it will be seen that such chuck, with its body portion 21, concentric taper 22, balls 23, flange 24, separator 25 fast connected with the flange 24 by the pins 31 or in any other suitable manner to be held concentric with the taper, and sleeve 26 carrying the flange with its ball-contacting face at right angles to the rotational axis, is essentially like the chuck illustrated in Figs. 1 to 5. Its principal difference lies in the fact that its threads 27 (V-shaped if desired) connecting the sleeve and the body portion are placed at the rear end of the sleeve, and in the fact that its plain cylindrical portions 28, 28 (separated if desired at 29) and the mating portions 30 of the body portion are wholly at one side of the threads.

In manufacturing it is sometimes more convenient to place the threads at the rear end of the sleeve and the illustrated arrangement permits this while giving a structure satisfactory as regards freedom from wabble.

The chuck 20 may be mounted in the machine in any suitable manner and I show it as provided with the usual concentric tapered shank 32 for insertion in the usual concentric female taper (not shown) of the spindle.

Either type of chuck may if desired be provided with a rubber or other flexible gasket 33, see Figs. 6 and 7, to be clamped between the flange and the work, as at 34, and to be clamped at its other end to the flange as by the annulus 35, the annulus 35 being clamped to the flange as by the screws 36 screwed into the hole 37 in the flange 24 or to be screwed into the holes 38 in the flange 10. Such a gasket prevents the entrance of the grinding dust to the surfaces of the taper and the outer periphery of the work and thereby eliminates a possible source of injury to those surfaces.

It will be seen that I have provided an external work holder which is simple, comparatively inexpensive to manufacture and capable of great accuracy.

Having thus described my invention, what I claim as new and desire to secure by Letters Patent is:

1. In an external chuck for holding work centered upon the rotating work head of a machine tool, a portion for connection with said head, a portion providing a female conical taper; said portions being so related that when the chuck is connected with said head said taper is concentric with the rotational axis of the head; and an annular series of a relatively large number of contact elements, independently radially movable, received within said taper in substantially point contact therewith, and having substantially-point-contact areas for contact with the work, said taper and said elements being mounted for movement with respect to each other longitudinally of said taper; substantially as described.

2. In an external work holder, an element providing a female conical taper, an annular series of contact elements in substantially point-contact with said taper and having contact areas for substantially point-contact with the work to be held, and an element shiftable longitudinally of said taper and carrying an abutment in the character of a flange and having a face for contact with said contact elements, such contact face being at right angles to the longitudinal axis of said taper and in contact with said contact elements at their sides; substantially as described.

3. In an external work holder, a body portion provided with a female conical taper, a cylindrical sleeve carried upon the exterior of said body portion to be moved longitudinally thereof and carrying an inwardly projecting flange located adjacent the larger end of said taper, and an annular series of contact elements located upon said taper and having portions for contact with the work to be held, said flange having a face lying at right angles to the longitudinal axis of said sleeve and arranged for contact with said contact elements, said sleeve and said body portion having mating cylindrical surfaces concentric with the axis of said taper for maintaining said sleeve in position upon said body without wabble thereby to maintain said flange face at right angles to the axis of said taper; substantially as described.

4. In an external work holder, a body portion provided with a female conical taper, a threaded sleeve carried upon the exterior of said body portion to be moved longitudinally thereof, said body portion having threads mating with those of said sleeve, said sleeve carrying an inwardly projecting flange located adjacent the larger end of said taper, and an annular series of contact elements located upon said taper and having portions for contact with the work to be held, said flange having a face lying at right angles to the longitudinal axis of said sleeve and arranged for contact with said contact elements, said sleeve and said body portion having mating cylindrical surfaces concentric with the axis of said taper for maintaining said sleeve in position upon said body without wabble thereby to maintain said flange face at right angles to the axis of said taper; substantially as described.

5. In an external work holder, a body portion provided with a female conical taper, such body portion having a character adapting it for mounting with the longitudinal axis of said taper coincident with the rotational axis of the spindle of a machine tool, a cylindrical sleeve carried upon the exterior of said body portion to be moved longitudinally thereof and carrying an inwardly projecting flange located adjacent the larger end of said taper, and an annular series of contact elements located upon said taper and having portions for contact with the work to be held, said flange having a face lying at right angles to the longitudinal axis of said sleeve and arranged for contact with said contact elements, said sleeve and said body portion having mating cylindrical surfaces concentric with the axis of said taper for maintaining said sleeve in position upon said body without wabble thereby to maintain said flange face at right angles to the axis of said taper; substantially as described.

6. In an external work holder, a body portion provided with a female conical taper, such body portion having a character adapting it for mounting with the longitudinal axis of said taper coincident with the rotational axis of the spindle of a machine tool, a threaded sleeve carried upon the exterior of said body portion to be moved longitudinally thereof, said body portion having threads mating with those of said sleeve, said sleeve carrying an inwardly projecting flange located adjacent the larger end of said taper, and an annular series of contact elements located upon said taper and having portions for contact with the work to be held, said flange having a face lying at right angles to the longitudinal axis of said sleeve and arranged for contact with said contact elements, said sleeve and said body portion having mating cylindrical surfaces concentric with the axis of said taper for maintaining said sleeve in position upon said body without wabble thereby to maintain said flange face at right angles to the axis of said taper; substantially as described.

7. In an external work holder, a body portion provided with a female conical taper, a sleeve carried upon the exterior of said body portion for movement longitudinally thereof and carrying an inwardly projecting flange located adjacent the larger end of said taper, an annular pocketed separator received within said taper, a series of balls carried in the pockets of said separator in contact with said taper and having portions arranged for contact with the work to be held, said flange contacting said balls and means for holding said sleeve in the positions to which it is shifted along said body portion; substantially as described.

8. In an external work holder, a body portion provided with a female conical taper, a sleeve carried upon the exterior of said body portion for movement longitudinally thereof and carrying an inwardly projecting flange located adjacent the larger end of said taper, an annular pocketed separator received within said taper, a series of balls carried in the pockets of said separator in contact with said taper and having portions arranged for contact with the work to be held, said flange contacting said balls, means connecting said separator and said sleeve whereby said separator is maintained in position and said balls are carried with said sleeve in its shifting movement, and means for holding said sleeve in the positions to which it is shifted along said body portion; substantially as described.

In testimony whereof, I hereunto affix my signature, in the presence of two witnesses.

CHARLES B. SIMMONS.

Witnesses:
HAROLD A. KINGSBURY,
VERNER A. GREENE.